(12) United States Patent
Winchell et al.

(10) Patent No.: US 6,788,946 B2
(45) Date of Patent: Sep. 7, 2004

(54) SYSTEMS AND METHODS FOR DELIVERING INFORMATION WITHIN A GROUP COMMUNICATIONS SYSTEM

(75) Inventors: Diane Winchell, San Diego, CA (US); Jon Korecki, San Diego, CA (US); Miles Kirby, San Diego, CA (US)

(73) Assignee: Qualcomm Inc, San Diego, CA (US)

( * ) Notice: Subject to any disclaimer, the term of this patent is extended or adjusted under 35 U.S.C. 154(b) by 279 days.

(21) Appl. No.: 09/835,262

(22) Filed: Apr. 12, 2001

(65) Prior Publication Data

US 2002/0151321 A1 Oct. 17, 2002

(51) Int. Cl.$^7$ .............................................. H04Q 7/20
(52) U.S. Cl. ....................... 455/459; 455/518; 455/557; 370/401; 709/249
(58) Field of Search .......................... 455/422, 518, 455/517, 519, 509, 520, 406, 405, 408, 557, 556, 459, 3.03, 3.01, 414.1; 370/462, 409, 947, 461, 338, 352–354, 349, 356, 389, 401, 312; 709/223, 208, 238, 227, 214, 213, 249; 707/10, 104; 379/88.17

(56) References Cited

U.S. PATENT DOCUMENTS

| | | | | |
|---|---|---|---|---|
| 5,481,254 A | * | 1/1996 | Gaskill et al. ......... 340/825.52 |
| 5,511,232 A | | 4/1996 | O'Dea | |
| 6,034,621 A | | 3/2000 | Kaufman | |
| 6,047,327 A | * | 4/2000 | Tso et al. ................... 709/232 |
| 6,085,101 A | * | 7/2000 | Jain et al. ................... 455/500 |
| 6,098,067 A | | 8/2000 | Erickson | |
| 6,101,381 A | * | 8/2000 | Tajima et al. .............. 455/414 |
| 6,209,032 B1 | | 3/2001 | Dutcher et al. | |
| 6,212,570 B1 | | 4/2001 | Hasebe et al. | |
| 6,246,336 B1 | * | 6/2001 | Hymel ...................... 340/7.41 |
| 6,252,952 B1 | * | 6/2001 | Kung et al. ............... 379/114.1 |
| 6,253,091 B1 | * | 6/2001 | Naddell et al. ............. 455/519 |
| 6,301,263 B1 | | 10/2001 | Maggenti | |
| 6,304,648 B1 | * | 10/2001 | Chang ................... 379/202.01 |
| 6,308,201 B1 | | 10/2001 | Pivowar et al. | |
| 6,442,250 B1 | * | 8/2002 | Troen-Krasnow et al. ........................ 379/93.15 |
| 6,449,344 B1 | * | 9/2002 | Goldfinger et al. ....... 379/88.17 |
| 6,463,273 B1 | * | 10/2002 | Day .......................... 455/404 |

FOREIGN PATENT DOCUMENTS

WO     WO 94/24826 A1 * 10/1994

\* cited by examiner

*Primary Examiner*—Charles Appiah
(74) *Attorney, Agent, or Firm*—Philip R. Wadsworth; Robert J. O'Connell; Sandip S. Minhas

(57) ABSTRACT

Systems and methods for delivering information include a communications network defined by at least a wireless telephone network coupled to a computer network, where the communications network is associated with a plurality of communication devices that define a group communications net. A communications manager is operable to provide a group communication session by receiving a data packet from one member of the group communications net and transmitting the data packet through the computer network to at least one of the other members of the group communications net. A message module having a plurality of informational messages is associated with the communications manager, and a delivery module is coupled to each of the message module, the communications manager, and the communications network. The delivery module is operable to monitor the group communication session and to deliver one of the plurality of informational messages to the group communications net. Further, methods of billing a user for participation in the group communications session include discounting an amount due based on receipt of informational messages.

7 Claims, 5 Drawing Sheets

SYSTEMS AND METHODS FOR DELIVERING INFORMATION WITHIN A GROUP COMMUNICATIONS SYSTEM

BACKGROUND OF THE INVENTION

This invention relates to group, or point to multi-point, communication systems, and more particularly, to systems and methods for delivering information within a group communications system.

Group or point-to-multipoint communication systems have been used to provide communications generally between a central location and multiple users of the system. For example, dispatch systems using Land Mobile Radios (LMRs) have been used in trucks, taxis, buses, and other vehicles in order to communicate scheduling information between a central dispatch center and one or more corresponding fleet vehicles. Communications may be directed at a specific vehicle in the fleet or to all vehicles simultaneously.

Another example of a point-to-multipoint communication system is a wireless push-to-talk system. Such a system allows a group of individuals, each having a wireless communication device, to communicate with other members of the group. Typically, a push-to-talk system relies on a single frequency, or dedicated channel, over which communications are received by the wireless communication devices. In most systems, only one member may transmit information to the other members at any given time. However, all members can listen to the dedicated broadcast channel to receive communications from the single member who is transmitting. Members desiring to transmit to other members of the system typically send an access request by depressing a push-to-talk button on their respective communication device that allows the user sole access to the dedicated channel.

Examples of uses of a push-to-talk system include workgroup communications, security communications, construction site communication, and localized military communications. The group of people requiring communications with each other is commonly known as a "net," and each member of the net may be referred to as a "net member."

A hindrance to participation and wider use of such nets is cost. For example, a net member may be charged on a per minute basis for participating in the net, or the net member may be charged a flat rate for a block of minutes and a different per minute rate for exceeding the block of minutes. In either case, the net member is encouraged to limit the amount of minutes participating in the net because of such per minute charges.

Additionally, each net and the associated net members define a market for entities having information, products or services that may be of interest to the net members. In typical group communications systems, however, this market is not accessible or definable.

BRIEF SUMMARY OF THE INVENTION

Thus, the systems and methods of delivering information provided by the present invention overcome the above-identified drawbacks.

In an embodiment of the invention, a system for delivering information, comprises: a communications network defined by at least a wireless telephone network coupled to a computer network, the communications network associated with a plurality of communication devices that define a group communications net; a communications manager operable to provide a group communication session by receiving a data packet from one member of the group communications net and transmitting the data packet through the computer network to at least one of the other members of the group communications net; a message module having a plurality of informational messages; and a delivery module coupled to each of the message module, the communications manager, and the communications network, the delivery module operable to monitor the group communication session and to deliver one of the plurality of informational messages to the group communications net.

In another embodiment, a system for delivering information, comprises: a communications network defined by at least a wireless telephone network coupled to a computer network, the communications network associated with a plurality of communication devices that define a group communications net; a message module having a plurality of informational messages; a controller module coupled to each of the message module and the communications network, the controller module operable to provide a group communication session by receiving a data packet from one member of the group communications net and transmitting the data packet through the computer network to at least one of the other members of the group communications net, and the controller module further operable to monitor the group communication session and to deliver a predetermined one of the plurality of messages to the group communications net; and a delivery manager coupled to the controller module, the delivery manager operable to schedule the delivery of the predetermined message based on predetermined delivery characteristics.

In yet another embodiment, a system for delivering information, comprises: a communications network defined by at least a wireless telephone network coupled to a computer network, the communications network associated with a plurality of communication devices that define a group communications net; a message module having a plurality of informational messages; a controller module coupled to each of the message module and the communications network, the controller module operable to provide a group communication session by receiving a data packet from one member of the group communications net and transmitting the data packet through the computer network to at least one other member of the group communications net, the controller module further operable to monitor the group communication session and deliver a predetermined one of the plurality of messages to the group communications net at a predetermined time, and the controller module further operable to generate an activity log for each of the plurality of communication devices tracking participating in the group communication session and receipt of the predetermined message; and a billing module operable to receive the activity log and generate a bill having an amount due for each of the plurality of communication devices, wherein the amount due is discounted based on the tracked receipt of the predetermined message associated with the respective communication device.

In a further embodiment, a system for delivering information via a communications network to a plurality of communications devices defining members of a group, comprises: a communications manager connectable to the communications network and to at least two members of the group, the communications manager operable to provide a group communication session by receiving a transmission from one member of the group and forwarding the transmission through the communications network to at least one other member of the group, wherein the communications network is defined by at least a wireless telephone network coupled to a computer network, wherein the transmission comprises a data packet; a message module having a plurality of informational messages each comprising a data packet; and a controller module connectable to each of the message module and the at least two members of the group, the controller module operable to monitor the group communication session and deliver a predetermined one of the plurality of messages to the group according to a predetermined delivery instruction.

In another embodiment, a method for delivering information, comprises: monitoring a group communication session among a plurality of communications devices associated with a communications network, the communications network defined by at least a wireless telephone network coupled to a computer network; and delivering one of a plurality of informational messages via the communications network to the plurality of communications devices.

In yet another embodiment, a method for delivering information, comprises: receiving identification of a plurality of communications devices to be included in a group communications session, where each of the plurality of communications devices is associated with a communications network that includes at least a wireless telephone network coupled to a computer network; establishing the group communications session by receiving a data packet from one communications device and transmitting the data packet through the computer network to at least one of the other communications devices; and delivering according to predetermined delivery characteristics one of a plurality of informational messages via the communications network to the communications devices participating in the group communications session.

In a further embodiment, a method for delivering information, comprises: receiving identification of a plurality of communications devices to be included in a group communications session, where each of the plurality of communications devices is associated with a communications network that includes at least a wireless telephone network coupled to a computer network; establishing the group communications session by receiving a data packet from one communications device and transmitting the data packet through the computer network to at least one of the other communications devices; delivering according to predetermined delivery characteristics one of a plurality of informational messages via the communications network to the communications devices participating in the group communications session; generating an activity log for each of the plurality of communication devices, the activity log tracking participation in the group communication session and receipts of the informational messages; and generating a bill having an amount due for each of the plurality of communication devices, where the amount due is a function of the participation in the group communication session and the receipt of the informational message associated with the respective communication device.

In a further embodiment, a method of charging a user for use of a communications device, comprises: receiving an activity log for each communication device of a plurality of communications devices, where each of the plurality of communications devices is associated with a communications network that includes at least a wireless telephone network coupled to a computer network, where the plurality of communications devices define a communications net, where transmissions of packet data between at least two members of the communications net defines a group communications session, and where the activity log tracks participation in group communication sessions and receipts of informational messages delivered from an informational message server associated with the communications net; and generating a bill having an amount due for each of the plurality of communication devices, where the amount due is a function of the participation in the group communication sessions and the receipt of the informational messages associated with the respective communication device.

Another embodiment of a system for delivering information, comprises: a means for networking communications devices defined by at least a wireless telephone network coupled to a computer network, the means for networking associated with a plurality of communication devices that define a group communications net; a means for storing a plurality of informational messages; a means for controlling communications coupled to each of the means for storing and the means for networking, the means for controlling communications operable to provide a group communication session by receiving a data packet from one member of the group communications net and transmitting the data packet through the means for networking to at least one other member of the group communications net, the means for controlling communications further operable to monitor the group communication session and deliver a predetermined one of the plurality of messages to the group communications net at a predetermined time, the means for controlling communications further operable to generate an activity log for each of the plurality of communication devices that tracks participation in the group communication session and receipt of the predetermined message; and a means for billing operable to receive the activity log and generate a bill having an amount due for each of the plurality of communication devices, wherein the amount due is discounted based on the tracked receipt of the predetermined message associated with the respective communication device.

And, in a further embodiment, a system for delivering information via a communications network to a plurality of communications devices defining members of a group, comprises: a means for transmitting communications connectable to the communications network and to at least two members of the group, the means for transmitting communications operable to provide a group communication session by receiving a transmission from one member of the group and forwarding the transmission through the communications network to at least one other member of the group, wherein the communications network is defined by at least a wireless telephone network coupled to a computer network, wherein the transmission comprises a data packet in an internet protocol format; a means for storing a plurality of informational messages each comprising a data packet; and a messaging means connectable to each of the means for storing and the at least two members of the group, the messaging means operable to monitor the group communication session and deliver a predetermined one of the plurality of messages to the group according to a predetermined delivery instruction.

DETAILED DESCRIPTION OF THE INVENTION

The present invention includes systems and methods for delivering information to communication devices within a communications net associated with a group communications system. In one aspect of the invention, a message module stores informational messages that are delivered to the communications devices within the net under the management of a control module or informational message server, which monitors the activity of the net. In another aspect, a delivery manager module schedules the delivery of the informational messages based on predetermined characteristics, such as a time period since the last information message was delivered or such as a time-sensitivity of the informational message. In yet another aspect, a billing module may determine a bill or cost associated with each communication device for use of the net and participation in group communications sessions, where the bill may be discounted or include credits based on receipt of the informational messages.

Figure 1:
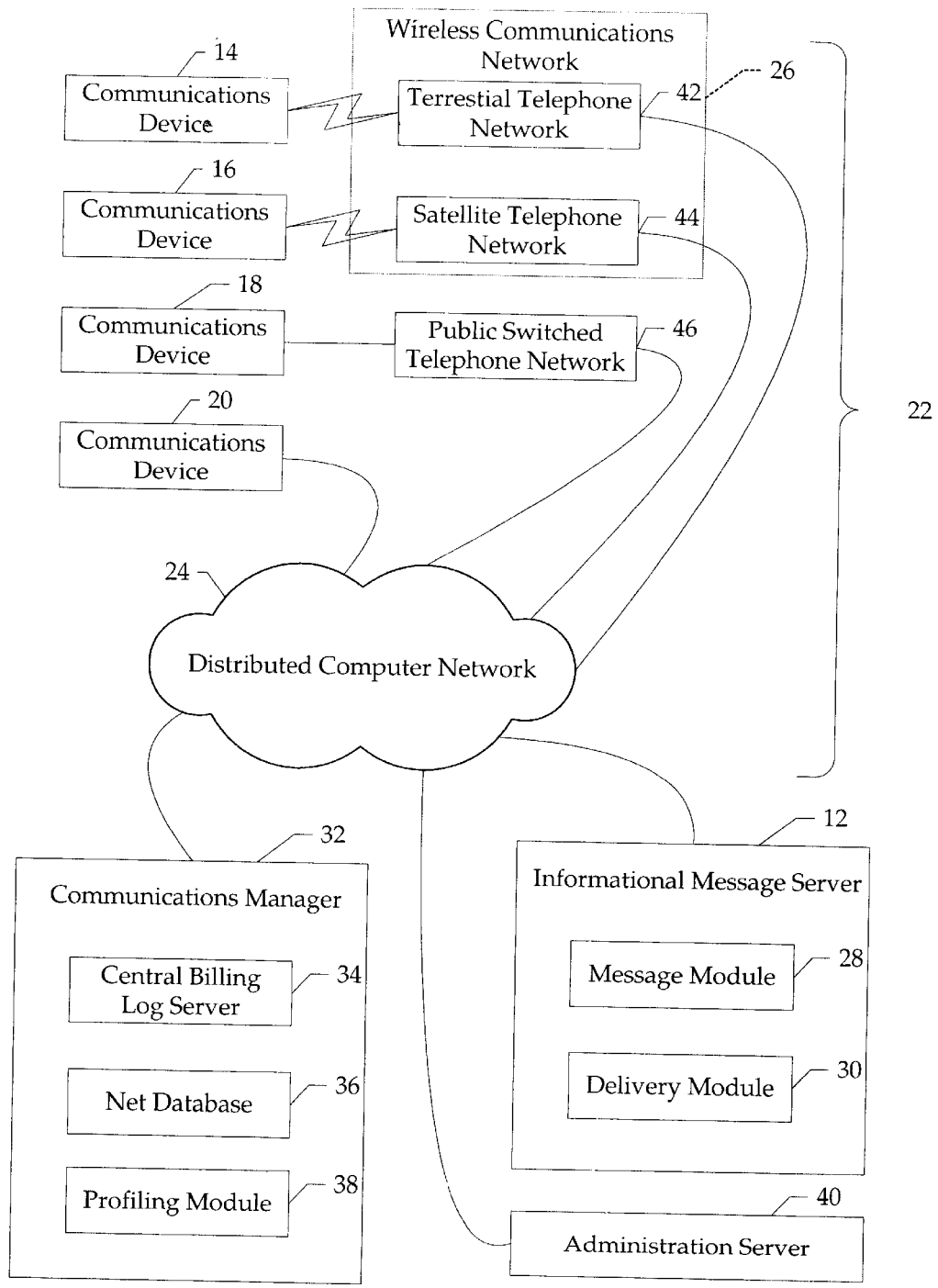
FIG. 1 is a functional block diagram of one embodiment of a system for delivering information within a group communications system.

Referring to FIG. 1, system 10 for delivering information to members of a group communications system includes, in one embodiment, informational message server 12 for delivering informational messages to at least two of a plurality of communications devices or net members 14, 16, 18 and 20 defining a group or net within communications network 22. Communications network 22 comprises at least one distributed computer network 24 and wireless communications network 26. Informational message server 12 comprises message module 28 configured to store a plurality of informational messages and their associated message characteristics, and delivery module 30 configured to monitor the transmissions within the net and controlling the delivery of predetermined ones of the informational messages. System 10 may further comprise controller or communications manager 32, configured to establish and control the net and the group communications session between communications devices 14, 16, 18 and 20. Further, communications manager 32 may comprise central billing log server 34 that tracks group or net activity and generates an associated user bill. Communications manager 32 may additionally comprise net database 36 configured to store information associating each net with its net members, and a profiling module 38 configured to associate profile information with each net and/or net member. Thus, informational message server 12 may interrupt a group communication session to deliver informational messages to net members according to predetermined delivery characteristics, which may include one or a combination of: a time period since the last informational message was delivered; a time-sensitivity of an informational message; and a match between informational message characteristics and net or net member profile characteristics. Furthermore, communications manager 32 may bill or charge an end user or net member for participating in group communications sessions, and the communications manager may discount the bill or issue a credit based on receipts of informational messages by the net member and/or net.

Additionally, system 10 may include administration or subscription site server 40 configured to provide an interface between system 10 and the users of the system, such as to set-up or modify the groups or nets. Although informational message server 12, communications manager 32 and administration server 40 and their respective components are described separately herein, they may be integrated into a single computer system, such as a system manager-type server. Alternatively, informational message server 12, communications manager 32, administration server 40, and their components may be separable in any combination and distributed anywhere throughout system 10.

The combination of communications manager 32, administration server 40, communications devices 14, 16, 18 and 20, and communications network 22 may define a group communications system, also known as a push-to-talk system, a net broadcast service (NBS) system, a dispatch system, or a point-to-multi-point communications system. A defining characteristic of such an NBS system is that, generally, only one user may transmit information to other users at any given time. For example, in an NBS system, a group of communication device users associated with a net, individually known as net members, communicate with one another using a communication device assigned to each net member. The term "net" denotes a group of communication device users authorized to communicate with each other. The net operates over an existing communications system, without requiring substantial changes to the existing infrastructure. In one embodiment, the net broadcast service (NBS) system enables Internet Protocol (IP) communication devices to participate in a group voice and data conference. NBS may be a Voice over IP (VoIP) application. Voice communication is transmitted from a talker endpoint communication device to one or more listeners by encapsulating voice frames in IP datagrams. Data with voice may also be transmitted in this manner. Suitable examples of such an NBS system are described in U.S. patent application Ser. No. 09/518,682, entitled "Method and Apparatus for Enabling Group Communication Services in an Existing Communication System" filed Mar. 3, 2000, U.S. patent application Ser. No. 09/518,776 entitled "Method and Apparatus for Participating in Group Communication Services in an Existing Communication System", filed Mar. 3, 2000, and U.S. patent application Ser. No. 09/518,985, entitled "Method and Apparatus for Providing Group Communication Services in an Existing Communication System" filed Mar. 3, 2000, and are specifically incorporated by reference herein.

Communications network 22 provides a communications link between communications devices 14, 16, 18 and 20 and the system manager-type components, such as informational message server 12, communications manager 32 and administration server 28. Communications network 22 includes a plurality of networks linked together to join together the communication device(s) associated with each distinct network to form a group or net. The plurality of networks may be any combination of one or more of any variety of global network and/or local network. Besides distributed computer network 24 and wireless communications network 26, communications network 22 may further include any other type of communications network capable of interfacing with distributed communications network 24 and/or wireless communications network 26. For instance, suitable examples of networks within communications network 26 include any system capable of transferring packet information using Internet Protocol (IP), such as a Code Division Multiple Access (CDMA) system, a Wideband Code-Division Multiple Access (WCDMA) system, a Time Division Multiple Access (TDMA) system, a General Packet Radio Service (GPRS) system, a Global System for Mobile Communications (GSM) system, satellite communication systems such as Globalstar™ or Iradium™, a Public Switched Telephone Network (PSTN), an Orthogonal Frequency Division Multiplexing (OFDM) System, a global distributed computer network such as the Internet, a public carrier network, a private carrier or enterprise network, a local area network (LAN), a wide area network (WAN), a cable television-type network, an optical network, a network of personal digital assistants or smart appliances such as a Bluetooth™ technology network, a wireless application protocol (WAP) network, or a variety of other systems and networks.

Net members communicate with each other through communications network using an assigned communication device, such as communication devices (CD) 14, 16, 18 and 20. CDs 14, 16, 18 and 20 include any device capable of transmitting and receiving packet information. Preferably, CDs 14, 16, 18 and 20 further include input, output and processing mechanisms for achieving the input, transmission, reception and/or output of the packet information. CDs 14, 16, 18 and 20 may be wireline or wireless communication devices such as terrestrial wireless telephones, wireline telephones having with push-to-talk capability, satellite telephones equipped push-to-talk functionality, wireless video cameras, still cameras, audio devices such as music recorders or players, laptop or desktop computers, paging devices, personal digital assistants, smart appliances or any combination thereof. For example, CD 14 may comprise a wireless terrestrial telephone having a video camera and display, connected to wireless network 42, or CD 14 may be a mobile telephone such as a QUALCOMM QCP®-860 phone or a mobile telephone with keys definied to operate as a push-to-talk phone; CD 16 may comprise a wireless satellite telephone connected to a satellite network 44; CD 18 may comprise a wireline telephone connected to a public switched telephone network 46; and CD 20 may comprise a personal computer connected directly to distributed computer network 24. Furthermore, each CD may be able to send and receive information in either a secure mode, or a non-secure (clear) mode. Throughout the following discussion, reference to an individual CD may be expressed as a wireless push-to-talk phone. It should be understood, however, that reference to a CD is not intended to be limited as such, and may encompass other communication devices that have the capability to transmit and receive packet information in accordance with Internet Protocol (IP).

Although each communication device was described above with reference to a given, associated network, it should be understood that a plurality of communications devices may be associated with a single network and form a net. For example, a net may include a plurality of terrestrial telephones connected to a wireless communications system. It should be further understood that a plurality of different-type communications devices may further be associated with a given network. For example, a net may include a plurality of terrestrial telephones and a plurality of personal computers connected to a private or enterprise network that includes a wireless communications network and a distributed computer network.

In system 10, a transmission privilege is defined which generally allows a single user to transmit information to other net members at any given time. The transmission privilege is granted or denied to requesting net members, depending on whether or not the transmission privilege is currently assigned to another net member when the request is received. The process of granting and denying transmission requests is known as arbitration. Other arbitration schemes evaluate factors such as priority levels assigned to each CD in determining whether a requesting net member is granted the transmission privilege.

In order to participate in system 10, each communications device 14, 16, 18 and 20 has the ability to request transmission privilege from controller or communications manager 32. Communications manager 32 generally manages the real-time and administrative operation of nets. Communications manager 32 may be any type of computer device having at least one processor and memory. In an embodiment, communications manager 32 is a Sun Netra T1™ workstation.

Communications manager 32 forms connections of individual communication devices to form one talk group, or net. The communications manager comprises a variety of functional capabilities in hardware and software that are configurable in different ways to accommodate different applications. Generally, the communications manager provides capability to manage real-time, administrative, and authenticity operations of nets, push-to-talk (PTT) request arbitration, maintenance and distribution of net membership and registration lists, call set-up and tear-down of necessary system and network resources, as well as overall control of net status. Further, communications manager 32 maintains a list of defined nets, defined as either clear or secure. A secure net relies on encryption provided by the individual CDs to provide authentication and guard against eavesdropping. Encryption for secure nets is implemented on an end-to-end basis, meaning that encryption and decryption takes place within each CD. Communications manager 32 generally operates without knowledge of security algorithms, keys, or policies.

Communications manager 32 manages remotely through either a communication system service provider, net members, or both, assuming that authorization is provided by the service provider. Communications manager 32 may receive net definitions through an external administration interface. For example, net members may request administrative actions through their service provider or administrate net functions through defined systems, such as a member-operated security manager or administration server that conforms to a communications manager 32 administration interface. Communications manager 32 can authenticate to high-grade commercial standards any party attempting to establish or modify a net.

Communications manager 32 maintains one or more databases and servers, such as central billing log server 34, net database 36 and profiling module 38, for managing information pertaining to individual net members as well as pertaining to each defined net. Central billing log server 34 collects and processes data associated with charging or billing a user for participating in a net. Net database 36 collects and processes data associating net members with nets. And, profiling module 38 collects and processes profile data associated with net members and/or nets.

Figure 2:
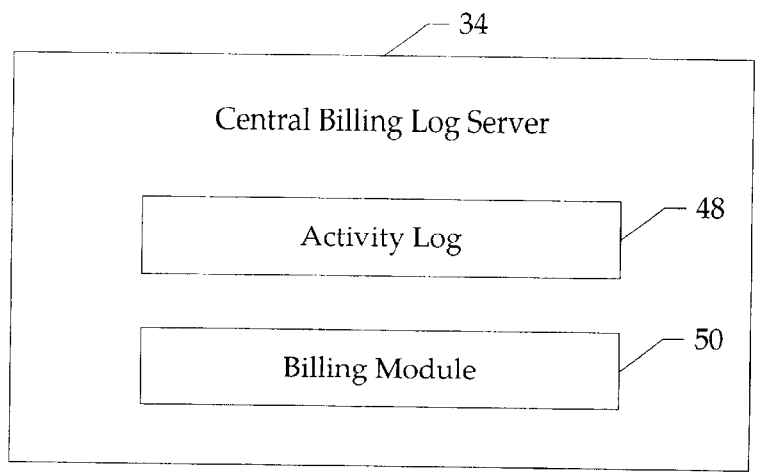
FIG. 2 is a block diagram of one embodiment of a central billing log server, and its components, associated with the system of FIG. 1.

Referring to FIG. 2, for example, central billing log server 34 may track and process identification information and participation times in an active net or group communications session for each net member over a given time period, such as a monthly billing cycle. Detailed log information of each user, such as which communication devices are active on the net, for how long, from where, and when and for how long each CD is a talker or a listener, is maintained. For instance, such data may be collected in activity log 48. Further, activity log 48 may be utilized to collect and maintain data associated with the receipt of informational messages, such as the number of informational messages received and the amount of time each net member listened to informational messages, over the given time period. Additionally, central billing log server 34 may comprise billing module 50 that comprises hardware, software, memory and programs for generating a bill with an amount due for each net member for a given billing cycle. Billing module 50 may comprise combinations of various tables associating active net talking and/or listening times with billable amounts or rates, various tables associating the number of informational messages received and/or the time associated with receiving and listening to informational messages with discount or credit amounts or rates, program plans having a given participation time for a given cost for each net member, net plans associating a cost for participating in one or more nets with each net member, and programs for comparing actual net participation to allowed plan net participation to determine the amount due, among other types of tables and programs. Other methodologies may also be utilized to determine an amount of money to charge a net user for association with a net and/or participation in a group communications session.

Figure 3:
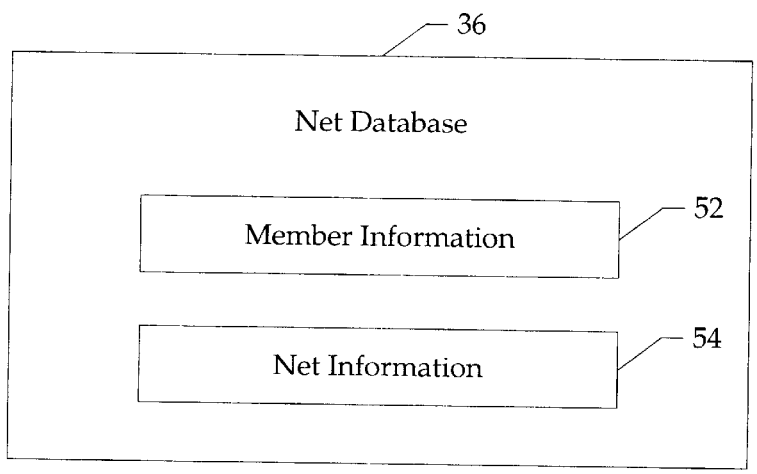
FIG. 3 is a block diagram of one embodiment of a net database, and its components, associated with the system of FIG. 1.

Referring to FIG. 3, for example, for each net member, net database 36 may comprise member information 52 such as a user name, account number, a telephone number, or dial number, associated with the member's CD, a Mobile Identification Number assigned to the CD, the current member's status in the net, such as whether the member is actively participating in the net, a priority code for determining how the transmission privilege is assigned, a data telephone number associated with the CD, an IP address associated with the CD, a URL (Uniform Resource Locator) identifier, and an indication of which nets the member is authorized to communicate, among the other types of information to facilitate a member's participation in a net. Additionally, net database 36 may further include net information 54 such as an identification of each CD associated with each net, an identification of the operating characteristics of the net, such as limitations on who may participate in the net, limits on the total number of net participants, identification of sponsors and/or managers or originators of the net, identification of whether the net is operated as a paid mode or sponsored mode net, identification of approved external administrative devices that may alter the characteristics and/or membership of the net, etc.

Figure 4:
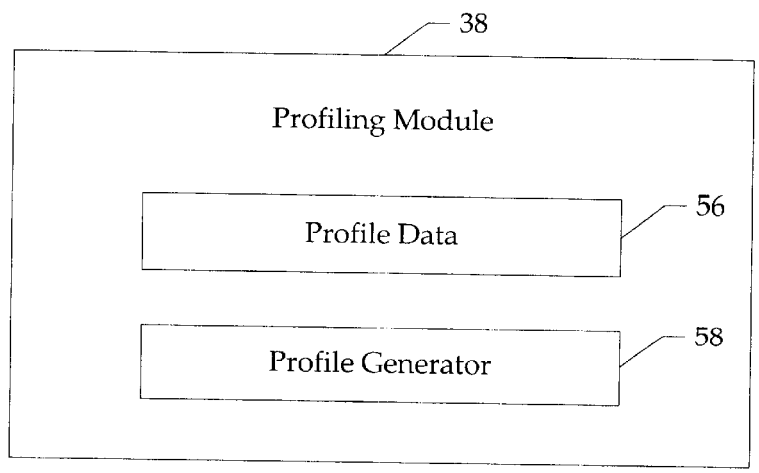
FIG. 4 is a block diagram of one embodiment of a profiling module, and its components, associated with the system of FIG. 1.

Other related types of information may also be stored by profiling module 38 with respect to each net and/or net member. For example, referring to FIG. 4, profiling module 38 may store profile data 56 associated with each net member or each net. Profile data 56 includes information gathered from each user or net member, for example during a registration or questionnaire process, or associated with each user, for example through activity logs 48. For instance, when an end user registers their CD for participation in a group communication system or for participation in a given net, they may be presented with a series of questions to be answered. The answering of the questions may be mandatory or voluntary in order to gain authorization to access the system, to gain authorization to participate in a net, or to continue participation in a net such as through a real-time questionnaire. For example, profile data 56 may include any combination of group information and individual net member information, such as composite group or individual member personal preference information, interests, hobbies, group or individual topics or focus, marketing information, socioeconomic information, family information, personal information, buying habit information, credit information, group participation information, communication device usage information, and any other type of information that may be associated with a net member and that may have a value, such as to aid in directing informational messages to the net members or nets, e.g. target marketing, or to aid the operator of the system in making access decisions, or to aid an originator of a net group in membership decisions, among other reasons. In an alternate embodiment, for example, profile data 56 may be stored with and comprise a portion of member information 52 and net information 54 within net database 36.

Additionally, profiling module 38 may include profile generator 58 for compiling, analyzing and classifying profile data 56 associated with each net member or each group/net. Further, profile generator 58 may create additional profile data 56 based on an analysis of the given profile data or activity log data for each net member or each net. For example, profile generator 58 may include software, hardware, firmware, etc., for presenting users with a registration request or questionnaire and for collecting answers to the questions and compiling them into profile data 56. Further, for example, the software of profile generator 58 may analyze the given profile data to categorize or classify the profile data, or to associate the given profile data with predetermined categories or classifications that may then be associated with the net member or net. The characterization of given profile data 56 may form additional profile data associated with a net or net user. Alternatively, or in addition, profile generator 58 may receive activity logs 48 for each group or individual user, as well as other information associated with the use of a communications device, such as a user's location as determined by a global positioning system (GPS) associated with each communications device, and compile, analyze and generate profile data 56 based on this information. In other words, profile generator 58 may receive and analyze any data associated with an individual user or group/net in order to characterize the data and associate the characterization with the user or group as part of profile data 56 such that, for example, the user or group may be targeted for delivery of an informational message having a matching characterization.

Figure 5:
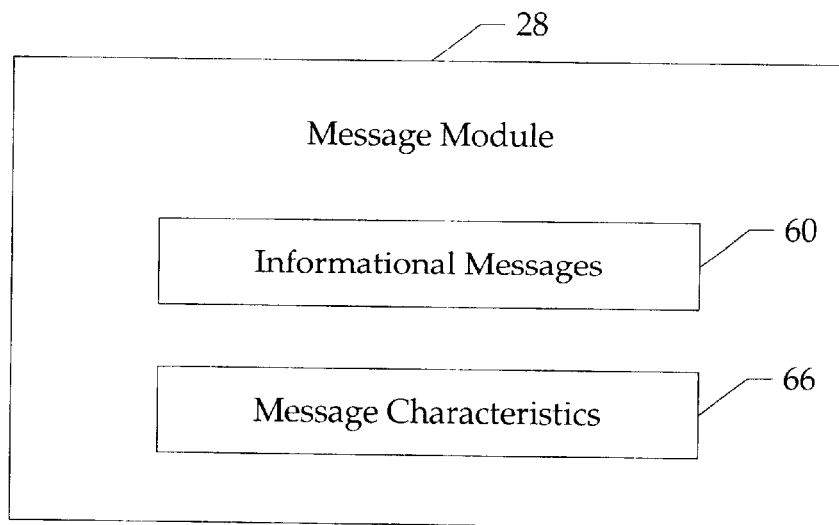
FIG. 5 is a block diagram of one embodiment of a message module, and its components, associated with the system of FIG. 1.
Figure 6:
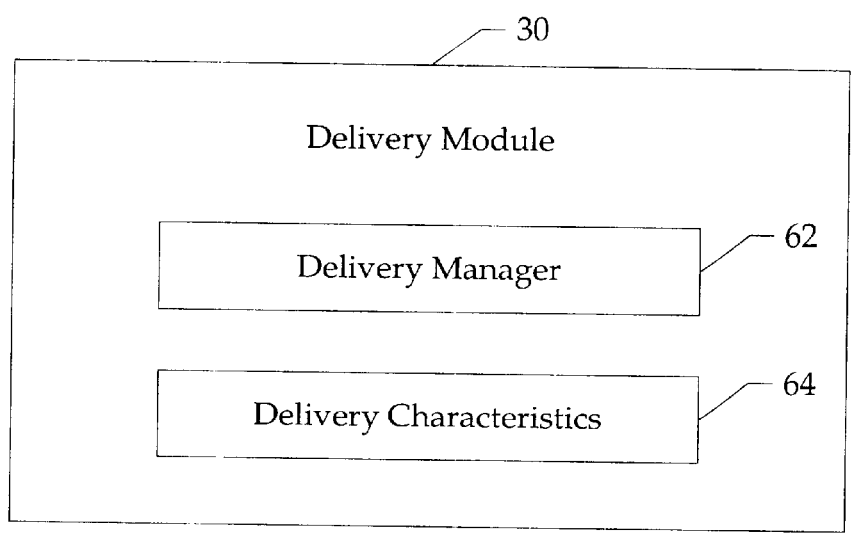
FIG. 6 is a block diagram of one embodiment of a delivery module, and its associated components, associated with the system of FIG. 1.

Referring to FIGS. 1, 5 and 6, information message server 12 stores a plurality of informational messages 60 in message module 28, and delivery manager 62 within delivery module 30 selects and delivers a predetermined informational message to a net or net member based on delivery characteristics 64. Referring to FIG. 5, message module 28 includes a database for storing the plurality of informational messages 60 and for storing message characteristics 66 associated with each of the messages. Each informational message 60 may include a datagram having voice data, audio data, alphanumeric data, media data such as video, combinations thereof, and any other type of data that may be replicated and/or transferred over the communications network defined herein. Preferably, each informational message 60 is a pre-recorded form of media capable of being stored for later, substantially simultaneous or instantaneous distribution to each member of the net, or in other words, delivery in real-time during an active group communications session. For example, the plurality of informational messages may include advertisements, announcements, informational updates such as news-related items, traffic reports, weather information, educational information, etc. Additionally, each informational message 60 has an associated duration, time period or length of play. Typically, although not a requirement, each informational message 60 is associated with one or more message characteristics 66. Message characteristics 66 includes data associated with a particular informational message 60 that defines, classifies or characterizes the informational message. In this manner, message characteristics 66 are similar to profile data 56 associated with each net member or net. For example, message characteristics 66 may include a timing status or time-sensitivity metric, such as a message that is non-time sensitive or a message that is time-sensitive meaning that it has a predetermined timing for delivery. Further, message characteristics 66 may include data defining a topic or subject matter of the message that may be utilized to target the message to a user or net having an interest in the content of the message. So, for example, an informational message comprising an advertisement for a car dealer may have a message characteristic that associates the message with automobiles, driving, etc., which may then be matched to a net group comprising a rush hour traffic talk group that may have similar profile data that associates the group with message.

Referring to FIG. 6, as mentioned above, delivery module 30 comprises delivery manager 62 configured to manage the delivery of informational messages 60 to nets and net members based on delivery characteristics 64. Delivery manager 62 may comprise hardware and software that monitor the activity of a net and/or net member and apply delivery characteristics 64 in order to determine when to deliver an informational message, and/or to select a particular informational message to deliver. Delivery characteristics 64 comprise a predetermined set of instructions that may be applied an informational message or applied to a particular net or net member to determine when to deliver an informational message and/or what informational message to deliver. Delivery characteristics 64 may include one or a combination of: a time period since the last informational message was delivered or from the initiation of the group communications session; a timing status or time-sensitivity of an informational message; and a match between informational message characteristics and net or net member profile data. As such, delivery manager 62 monitors or receives reports of the group activity and may interrupt a group session and randomly deliver an informational message to a net, such as based on a duration of a group session or a timing status of a message. Or, delivery manager 62 may selectively deliver an informational message to a net, such as by associating a net and an informational message based on a match between their profile data 56 and message characteristics 66, respectively. To determine a match, delivery module 30 may access message module 28 and profiling module 36 to compare the message characteristics of a given informational message with the profile characteristics of a given net or net member in order to target the delivery of the given informational message.

Figure 7:
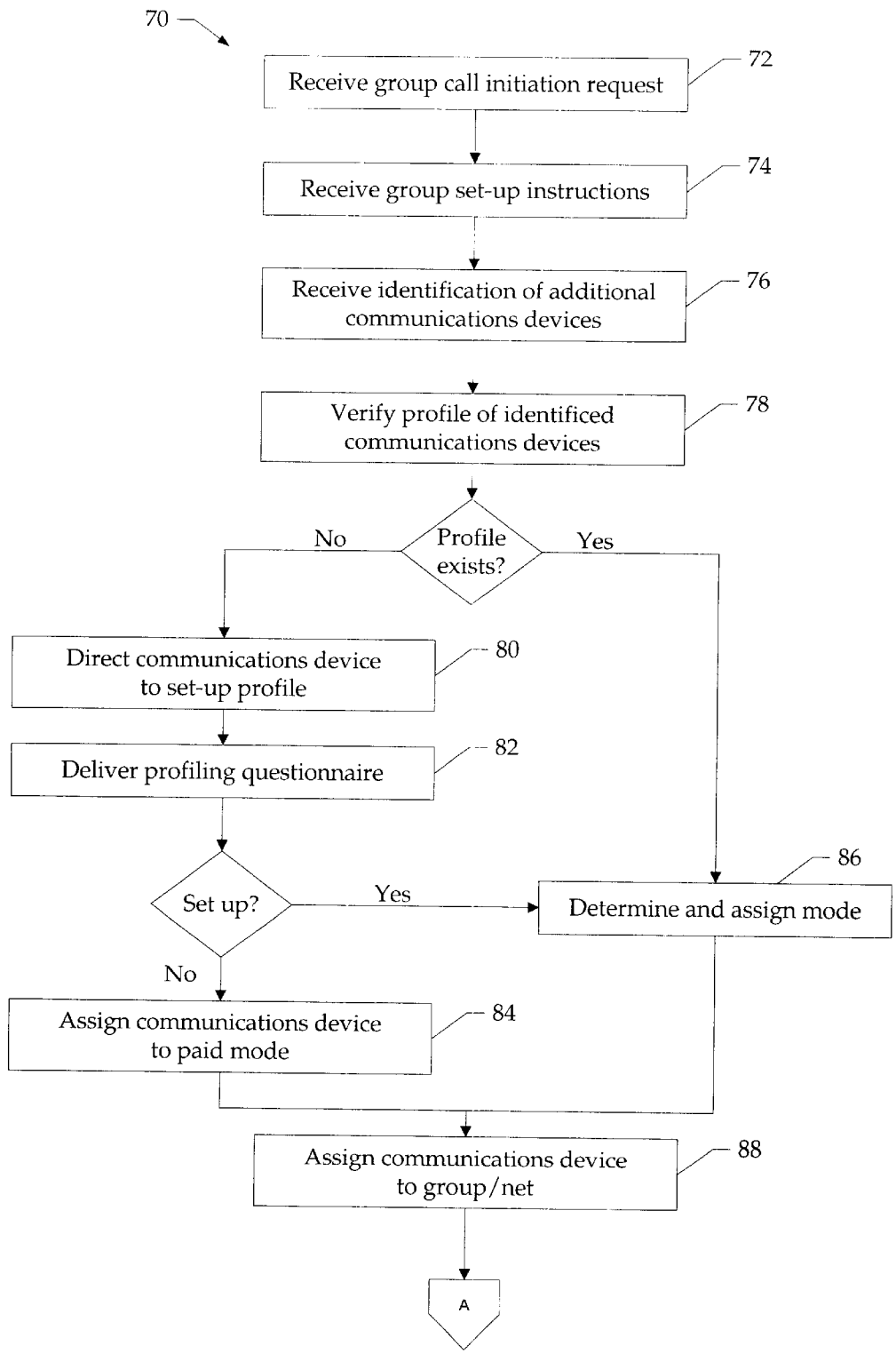
FIGS. 7 and 8 are functional block diagrams of one embodiment of a method for delivering informational messages within a group communications system.
Figure 8:
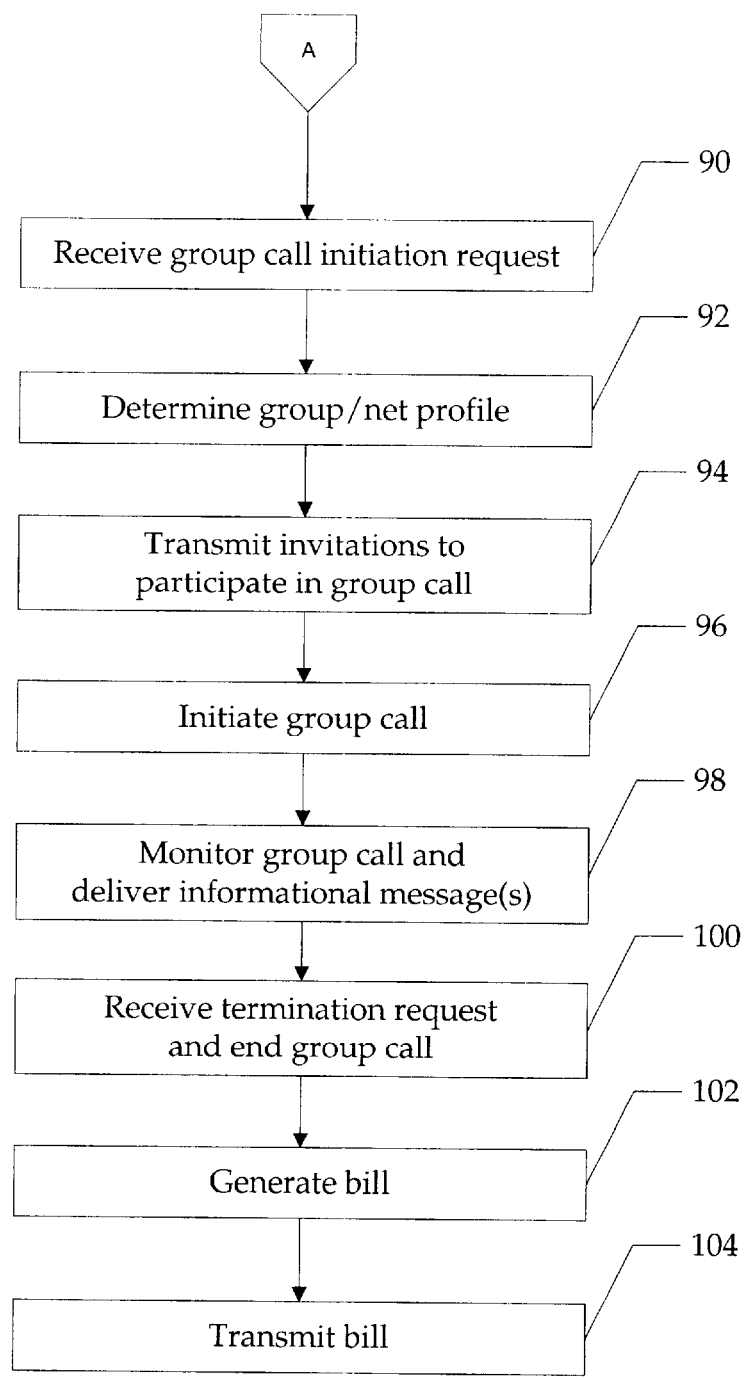

In operation, referring to FIGS. 7 and 8, one embodiment of a method 70 for delivering information within a group communications system, utilizing the embodiment of system 10 (FIG. 1) described above, includes receiving a request from a user or group originator through a communications device to initiate a group call or group communications session (Block 72). For example, the user or group originator may contact the communications manager by dialing a predetermined number on a wireless telephone, where the predetermined number is associated with software within the communications manager for initiating a group communications session. Further, for example, the communications manager may receive group set-up instructions from the user, such as to establish the parameters of the group communications session (Block 74). The parameters of the group communications session that may be set-up by the user include, for example, selecting a sponsored mode, selecting a paid mode, naming the group or the session, providing a description of the subject matter of interest to or topic to be discussed by the group or during the session. The sponsored mode may include a group communications session that the user or group originator intends to be sponsored or funded by an entity outside of the communications net, rather than being fully charged to each net participant. For example, when in the sponsored mode, informational messages stored in the informational message server may be automatically delivered to the net members during the group communications session and each net member may have their cost of participating in the session reduced based on the number of informational messages they receive and listen to. In that case, the entity associated with each informational message may pay a fee for having their informational message delivered to the net, where the fee paid by the entity pays for or offsets the cost of the group communication session for each net member. The paid mode may include a mode of a group communications session where each net member is directly charged for their participation in the group session. Typically, but not necessarily always, by selecting the paid mode, the user or group originator avoids the insertion of informational messages into the active group communication session.

Further, the method includes receiving an identification of additional communications devices to form the communications net and participate in the group communications session (Block 76). For example, the user or group originator may select a predefined group of communications devices, also known as a communications net, or the user may create a new, ad hoc group or communications net, or the user may select some combination of predefined groups and individual communication devices. The communications net may be selected from a list of predefined nets or from a list of users/communications devices, such as in a phone book or in a directory service, for example, stored within the user's communication device or within the communications manager. The method may include verifying that a user profile, including profile data, exists for each identified user or communications device associated with the communications net (Block 78). For example, the communications manager may access the profiling module to check for the existence of profile data associated with each identified user/communications device. If a user profile does not exist, then the selected user may be directed to setup their own profile (Block 80). The identified user not having a profile may set-up their profile in a variety of manners, such as by accessing the communications manager and answering a profiling questionnaire delivered by the profiling module (Block 82). For example, the identified user may respond to the profiling request on their communications device, such as over a wireless telephone network with a wireless phone or over a computer network with a personal computer, through the administration server, or by any other method that may be utilized to communicate with the communications manager. If the profiling questionnaire is not completed, then the identified user may be assigned to a paid mode (Block 84). Once an identified user has established a user profile, then the system determines the mode to associate with the identified user for the group call and assigns the mode (Block 86). For example, the user may identify a mode that overrides a group mode established in the group set-up, or vice versa. The communications manager then adds the identified user to the group or net (Block 88). If the identified user does not establish a profile, as mentioned above, then the identified user is associated with a paid mode (Block 84) and the communications manager adds the identified user to the group or net (Block 88). In embodiments of the present invention, communication groups or nets may require all members to have the same designated mode, i.e. paid mode or sponsored mode, or alternatively net members may have different modes. For example, if the net comprises members associated with both paid and sponsored modes, then the communications manager may require the sponsored mode members to receive informational messages prior to joining the group session, or may only interrupt the group session for those members to deliver the informational message. If pre-delivering the informational messages, the communications manager may track the group session length of the members and estimate an average group session length in order to determine the number and length of informational messages to pre-deliver to the sponsored mode members. Further, the communications manager may track each individual members group sessions and informational messages received, and then pre-deliver more or less informational messages for each member depending on the individual statistics associated with each member. Whether or not the group mode or the individually-identified mode takes priority may be a function of predetermined rules within the system, the group or the individual user profile.

Once the entire group has been identified, then the profiling module determines a group profile (Block 90). For example, the group profile comprises a composite characterization of the group based on the profile data associated with each individual user. This individual profile data may include data provided by each individual or generated by the profiling module according to a predetermined set of instructions, such as an user profiling program, and based upon the received profile data. Similarly, the group profile data may be generated by the profiling module according to another predetermined set of instructions, such as a group profiling program, and based upon the received and generated user profile data. Further, after identification of the entire group, the group call is initiated by the communications manager which transmits invitations to the identified users, asking them to participate in a group communications session (Block 92). For example, the invitation may include information such as an identification of the group originator, the other group members, set-up information such as the mode and the identification of the topic or subject matter of interest, etc. Each identified user may then respond to the request, and if not already completed, provide profile data in order to participate in a sponsored mode. The communications manager initiates the group session, such as upon receiving the first acceptance of an invitation (Block 94). As such, the group session includes at least the session originator and one other communications device. If the group session is a sponsored mode session, or if an individual participant in associated with a sponsored mode, then the group session is monitored and informational messages are delivered to one or more of the net members (Block 96). As discussed above, the informational messages may be delivered according to predetermined delivery characteristics, which may include one or a combination of: a time period since the last informational message was delivered; a time-sensitivity of an informational message; and a match between informational message characteristics and net or net member profile characteristics. For example, at a time when the informational message is to be delivered, the communications manager may give the informational message server the top transmission priority so that a transmission request by the informational server to deliver an informational message overrides any other transmission request. As such, at the designated time, once the net member with pre-existing transmission priority finishes their communication, the informational message server gains transmission priority and transmits the predetermined informational message, thereby inserting the message into the group communications session. Alternatively, there may be occasions, such as with time-sensitive informational messages like emergency messages, where the communications manager terminates the priority of a communications device in the middle of a communication in order to allow the informational message server to deliver the emergency message to the net. Further, the system monitors each communication device's receipt of each informational message (Block 98). For example, the system tracks the receipt of informational messages and associates this data including, for example, the number of messages received and associated time period, with each communications device in a log. Once the transmission of the informational message is completed, then the group session may continue in the normal manner.

The group session may be ended by the group originator, or alternatively by any net member, such as by transmitting a predetermined termination signal to the communications manager or simply by the last person "hanging-up" or ending their participation in the group session (Block 100). Furthermore, based on the monitoring and logging of each user's participation in any group sessions and receipt of informational messages, the communications manager may generate a bill or charge associated with end user or net member for participating in group communications sessions, and the communications manager may discount the bill or issue a credit based on receipts of informational messages by the net member and/or net (Block 102). The bill may then be transmitted to the associated net member in any manner, such as electronically through the communications network or physically via a mail delivery service such as the United States Post Office (Block 104). Typical bill generation and collection services may be utilized when supplied with the group call and informational message receipt data from the present system.

Thus, the communications device establishes the group communications session between the members of the net associated with a communications network that includes at least a wireless network and a distributed computer network. The communications manager monitors or receives reports of the group activity and may randomly or selectively deliver an informational message to a net. The communications of the net members, and the informational messages are datagrams formatted according to an internet protocol, for example a voice over IP protocol. The random delivery of informational messages, for example, may be based on a duration of a group session or a timing status of a message. The selective delivery of an informational message, for example, may be based on an association between the net and a selected one of a plurality of informational messages based on a match between their respective profile data and message characteristics. For example, to determine a match, the communications manager or informational message server may access message module and profiling module to compare the message characteristics of a given informational message with the profile characteristics of a given net or net member in order to target the delivery of the given informational message to the net or net member. A net members' participation in the group communications sessions, and their receipt of informational messages is monitored and logged, and they are billed an appropriate amount according to predetermined billing parameters based thereon. Therefore, the systems and methods of the present invention provide for the delivery of informational messages within a group communications system.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

Other features and advantages of the invention are set forth in the following claims.

What is claimed is:

1. A system for delivering information, comprising:
 a communications network defined by at least a wireless telephone network coupled to a computer network, the communications network associated with a plurality of communication devices that define a group communications net;
 a message module having a plurality of informational messages;
 a controller module coupled to each of the message module and the communications network, the controller module operable to provide a group communication session by receiving a data packet from one member of the group communications net and transmitting the data packet through the computer network to at least one of the other members of the group communications net, and the controller module further operable to monitor the group communication session and to deliver a predetermined one of the plurality of messages to the group communications net; and
 a delivery manager coupled to the controller module, the delivery manager operable to schedule the delivery of the predetermined message based on predetermined delivery characteristics.

2. The system of claim 1, wherein the predetermined delivery characteristics comprise a predetermined time interval measured from a time of the last-delivered message or from a time of an initiation of the group communications session.

3. The system of claim 1, wherein each of the plurality of informational messages have an associated timing status indicating that the respective message is time-sensitive or non-time-sensitive, and wherein the predetermined delivery characteristics comprise the timing status.

4. The system of claim 3, wherein the predetermined delivery characteristics further comprise a predetermined time interval measured from a time of a last-delivered message or from a time of an initiation of the group communications session, and wherein the delivery manager is operable to schedule delivery of the predetermined message according to the timing status if the timing status is time-sensitive or according to the predetermined time interval if the timing status is non-time-sensitive.

5. A system for delivering information, comprising:
 a communications network defined by at least a wireless telephone network coupled to a computer network, the communications network associated with a plurality of communication devices that define a group communications net;
 a message module having a plurality of informational messages;
 a controller module coupled to each of the message module and the communications network, the controller module operable to provide a group communication session by receiving a data packet from one member of the group communications net and transmitting the data packet through the computer network to at least one other member of the group communications net, the controller module further operable to monitor the group communication session and deliver a predetermined one of the plurality of messages to the group communications net at a predetermined time, and the controller module further operable to generate an activity log for each of the plurality of communication devices tracking participating in the group communication session and receipt of the predetermined message; and
 a billing module operable to receive the activity log and generate a bill having an amount due for each of the plurality of communication devices, wherein the amount due is discounted based on the tracked receipt of the predetermined message associated with the respective communication device.

6. A method for delivering information, comprising:
 receiving identification of a plurality of communications devices to be included in a group communications session, where each of the plurality of communications devices is associated with a communications network that includes at least a wireless telephone network coupled to a computer network;
 establishing the group communications session by receiving a data packet from one communications device and transmitting the data packet through the computer network to at least one of the other communications devices;
 delivering according to predetermined delivery characteristics one of a plurality of informational messages via the communications network to the communications devices participating in the group communications session;
 generating an activity log for each of the plurality of communication devices, the activity log tracking participation in the group communication session and receipts of the informational messages; and
 generating a bill having an amount due for each of the plurality of communication devices, where the amount due is a function of the participation in the group communication session and the receipt of the informational message associated with the respective communication device.

7. A system for delivering information, comprising:
 a means for networking communications devices defined by at least a wireless telephone network coupled to a computer network, the means for networking associated with a plurality of communication devices that define a group communications net;

a means for storing a plurality of informational messages;

a means for controlling communications coupled to each of the means for storing and the means for networking, the means for controlling communications operable to provide a group communication session by receiving a data packet from one member of the group communications net and transmitting the data packet through the means for networking to at least one other member of the group communications net, the means for controlling communications further operable to monitor the group communication session and deliver a predetermined one of the plurality of messages to the group communications net at a predetermined time, the means for controlling communications further operable to generate an activity log for each of the plurality of communication devices that tracks participation in the group communication session and receipt of the predetermined message; and a means for billing operable to receive the activity log and generate a bill having an amount due for each of the plurality of communication devices, wherein the amount due is discounted based on the tracked receipt of the predetermined message associated with the respective communication device.

* * * * *